United States Patent
van Borselen et al.

(10) Patent No.: US 9,846,247 B2
(45) Date of Patent: Dec. 19, 2017

(54) METHODS AND SYSTEMS FOR INTERPOLATION OF MULTI-COMPONENT SEISMIC DATA COLLECTED IN A MARINE ENVIRONMENT

(71) Applicant: PGS Geophysical AS, Lysaker (NO)

(72) Inventors: Roald Gunnar van Borselen, Voorschoten (NL); Robertus F. Hegge, Rijswijk (NL)

(73) Assignee: PGS GEOPHYSICAL AS, Oslo (NO)

( * ) Notice: Subject to any disclaimer, the term of this patent is extended or adjusted under 35 U.S.C. 154(b) by 790 days.

(21) Appl. No.: 14/053,264

(22) Filed: Oct. 14, 2013

(65) Prior Publication Data
US 2014/0269181 A1   Sep. 18, 2014

Related U.S. Application Data

(60) Provisional application No. 61/794,947, filed on Mar. 15, 2013.

(51) Int. Cl.
*G01V 1/30* (2006.01)
*G01V 1/38* (2006.01)

(52) U.S. Cl.
CPC ............ *G01V 1/30* (2013.01); *G01V 1/38* (2013.01); *G01V 2210/57* (2013.01)

(58) Field of Classification Search
CPC .......... G01V 1/30; G01V 1/38; G01V 2210/57
USPC .......................................................... 367/21
See application file for complete search history.

(56) References Cited

U.S. PATENT DOCUMENTS

| | | | | |
|---|---|---|---|---|
| 6,292,754 B1 * | 9/2001 | Thomsen | ................ | G01V 1/28 702/14 |
| 7,107,159 B2 * | 9/2006 | German | ................... | G01N 3/30 702/33 |
| 7,123,548 B1 * | 10/2006 | Uzes | ........................ | G01S 3/143 367/135 |
| 7,164,619 B2 * | 1/2007 | Robertsson | ........... | G01V 1/286 367/15 |
| 7,372,774 B1 * | 5/2008 | Uzes | ........................ | G01S 3/143 367/135 |
| 7,379,386 B2 * | 5/2008 | Muyzert | ................ | G01V 1/364 367/63 |

(Continued)

FOREIGN PATENT DOCUMENTS

| | | |
|---|---|---|
| GB | 2450122 A | 12/2008 |
| GB | 2479200 A | 10/2011 |
| NO | GB 2479200 A * | 10/2011 ............ G01V 1/284 |

OTHER PUBLICATIONS

EP Search Report, Application No. 14158639.6-1559/2778720, dated Dec. 14, 2015.

(Continued)

*Primary Examiner* — Luke Ratcliffe
*Assistant Examiner* — Amie M N'Dure

(57) ABSTRACT

Computational systems and methods for interpolating a pressure wavefield based on pressure wavefield and particle motion wavefield data are disclosed. The pressure and particle motion wavefields are sampled at a sample rate that is less than a lower bound for sample rates typically used to interpolate the pressure wavefield from the pressure wavefield samples alone. The particle motion wavefield can an acceleration wavefield or a time derivative of a velocity wavefield.

20 Claims, 10 Drawing Sheets

(56) References Cited

U.S. PATENT DOCUMENTS

| | | | | |
|---|---|---|---|---|
| 7,394,724 B1* | 7/2008 | Uzes | ............... | G01S 3/04 367/134 |
| 7,421,346 B2* | 9/2008 | Goujon | ............ | G01V 1/3808 702/14 |
| 7,423,934 B1* | 9/2008 | Uzes | ............... | G01S 3/143 367/135 |
| 7,643,377 B1* | 1/2010 | Uzes | ............... | G01S 3/04 367/135 |
| 7,679,998 B1* | 3/2010 | Uzes | ............... | G01S 3/04 367/135 |
| 7,782,710 B1* | 8/2010 | Uzes | ............... | G01S 3/143 367/135 |
| 7,791,980 B2 | 9/2010 | Robertsson et al. | | |
| 8,542,555 B1* | 9/2013 | Uzes | ............... | G01S 3/143 367/87 |
| 2003/0078734 A1* | 4/2003 | Ozbek | ............ | G01V 1/364 702/14 |
| 2004/0076077 A1* | 4/2004 | Robertsson | ......... | G01V 1/286 367/15 |
| 2004/0215396 A1* | 10/2004 | Christie | ............ | G01V 1/28 702/14 |
| 2005/0267695 A1* | 12/2005 | German | ............ | G01N 3/30 702/41 |
| 2005/0273266 A1* | 12/2005 | Nickel | ............ | G01V 1/286 702/14 |
| 2007/0282200 A1* | 12/2007 | Johnson | ............ | A61B 5/05 600/437 |
| 2008/0049551 A1* | 2/2008 | Muyzert | ............ | G01V 1/364 367/24 |
| 2008/0109168 A1* | 5/2008 | Koren | ............ | G01V 1/32 702/16 |
| 2008/0173104 A1* | 7/2008 | German | ............ | G01N 3/30 73/862.381 |
| 2008/0219094 A1* | 9/2008 | Barakat | ............ | G01V 1/247 367/21 |
| 2008/0259726 A1* | 10/2008 | van Manen | ............ | G01V 1/36 367/24 |
| 2009/0157322 A1* | 6/2009 | Levin | ............ | G01V 1/34 702/16 |
| 2009/0210158 A1* | 8/2009 | German | ............ | G01N 3/30 702/2 |
| 2010/0020637 A1* | 1/2010 | Welker | ............ | G01V 1/3826 367/16 |
| 2010/0074054 A1* | 3/2010 | Barakat | ............ | G01V 1/247 367/76 |
| 2010/0211319 A1* | 8/2010 | van Manen | ............ | G01V 1/364 702/14 |
| 2010/0211322 A1* | 8/2010 | Vassallo | ............ | G01V 1/364 702/14 |
| 2011/0051551 A1* | 3/2011 | Tenghamn | ............ | G01V 1/364 367/24 |
| 2011/0096625 A1* | 4/2011 | Rentsch | ............ | G01V 1/36 367/38 |
| 2011/0242935 A1* | 10/2011 | Amundsen | ............ | G01V 1/284 367/21 |

OTHER PUBLICATIONS

EP Search Report, Application No. 14158639.6-1559/2778720.

Papoulis, Athanasios, "Generalized Sampling Expansion", IEEE Transactions on Circuits and Systems, vol. CAS-24, No. 11, Nov. 1977, pp. 652-654.

Robertsson, Johan O. A., et al., "On the use of multicomponent streamer recordings for reconstruction of pressure wavefields in the crossline direction," Geophysics, vol. 73 No. 5, Sep.-Oct. 2008, pp. A45-A49.

Vassallo, Massimiliano et al., "Crossline wavefield reconstruction from multicomponent streamer data: Part 1—Multichannel interpolation by matching pursuit (MIMAP) using pressure and its crossline gadient," Geophysics, vol. 75, No. 6, Nov.-Dec. 2010, pp. WB53-WB67.

* cited by examiner

METHODS AND SYSTEMS FOR INTERPOLATION OF MULTI-COMPONENT SEISMIC DATA COLLECTED IN A MARINE ENVIRONMENT

CROSS-REFERENCE TO RELATED APPLICATION

This application claims the benefit of Provisional Application No. 61/794,947, filed Mar. 15, 2013.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are essential for quantitative seismic interpretation and reservoir monitoring. For a typical marine seismic survey, an exploration-seismology vessel tows a seismic source and the same, or another vessel, tows one or more streamers that form a seismic data acquisition surface below the surface of the water and over a subterranean formation to be surveyed for hydrocarbon deposits. The vessel contains seismic acquisition equipment, such as navigation control, seismic source control, seismic receiver control, and recording equipment. The seismic source control activates the seismic source, which is typically an array of source elements, such as air guns, to produce acoustic impulses at selected times. Each acoustic impulse is a sound wave that travels down through the water and into the subterranean formation. At each interface between different types of rock, a portion of the sound wave is transmitted and another portion is reflected back toward the body of water to propagate toward the surface. The streamers towed behind the vessel are elongated cable-like structures. Each streamer may include a number of seismic receivers or multi-component sensors that record pressure and particle motion wavefields associated with the sound waves reflected back into the water from the subterranean formation. The recorded pressure and particle motion wavefields are transmitted along the streamers to the survey vessel were the wavefields are stored and may be processed on board the survey vessel using the acquisition equipment. Because the pressure and particle motion wavefields are typically collected over large survey areas using numerous streamers, each equipped with a multitude of receivers, the pressure and particle motion data collected can be extremely large and costly to store and process. Those working in the petroleum industry continue to seek methods and systems that reduce the overall amount of data collected in a marine survey while not compromising on the quality of the results produced from the reduced amounts of seismic data.

DETAILED DESCRIPTION

This disclosure presents computational systems and methods for interpolating a pressure wavefield based on pressure wavefield and particle motion wavefield data recorded in a marine seismic survey. The pressure and particle motion wavefields are sampled at a sample rate that is less than a lower bound for sample rates typically used to interpolate the pressure wavefield from the pressure wavefield samples alone. The particle motion wavefield can be an acceleration wavefield or a time derivative of a velocity wavefield.

Marine Seismic Data Acquisition Systems

Figure 1A:
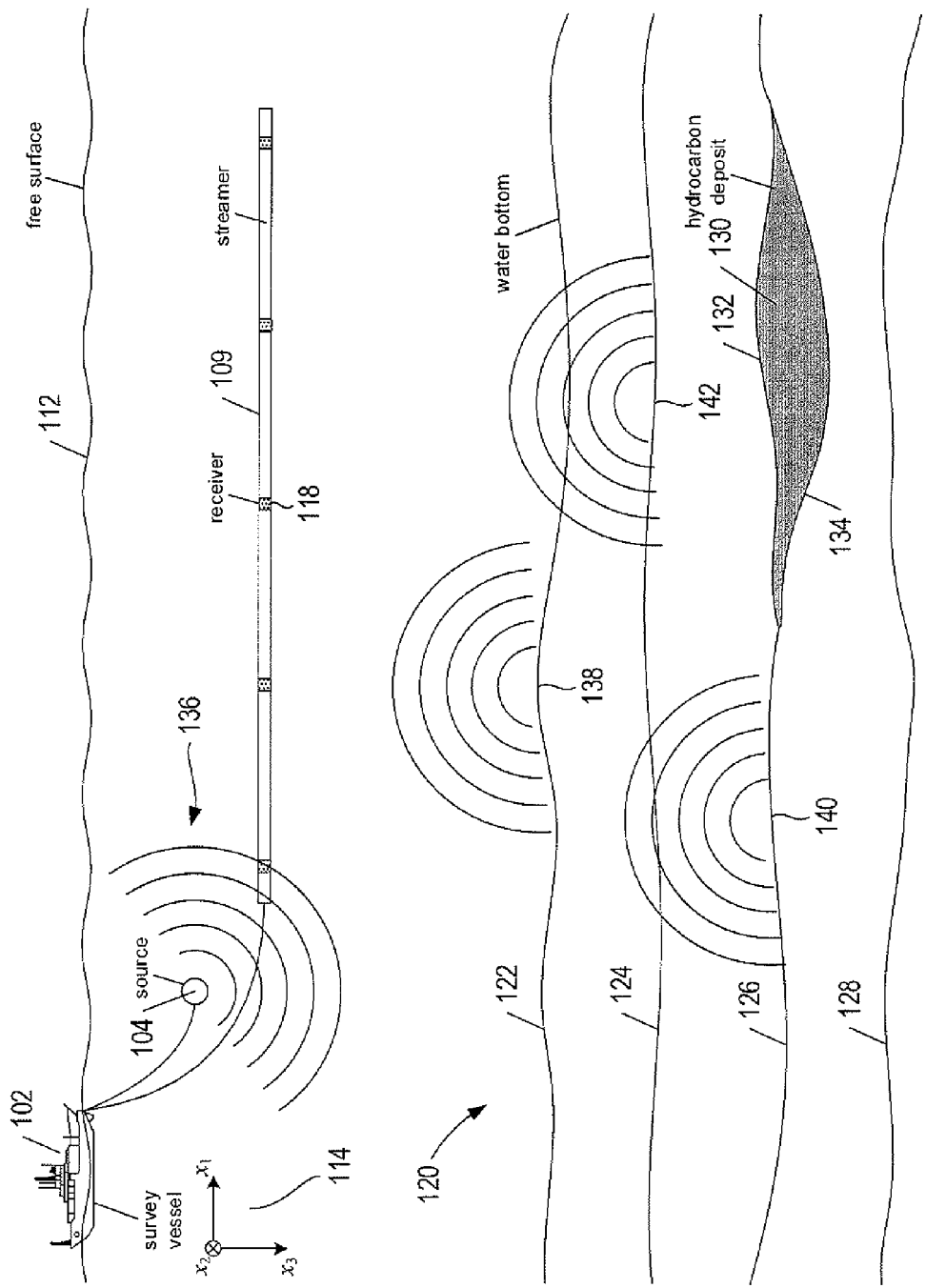
FIGS. 1A-1B show side-elevation and top views, respectively, of a marine seismic data acquisition system.
Figure 1B:
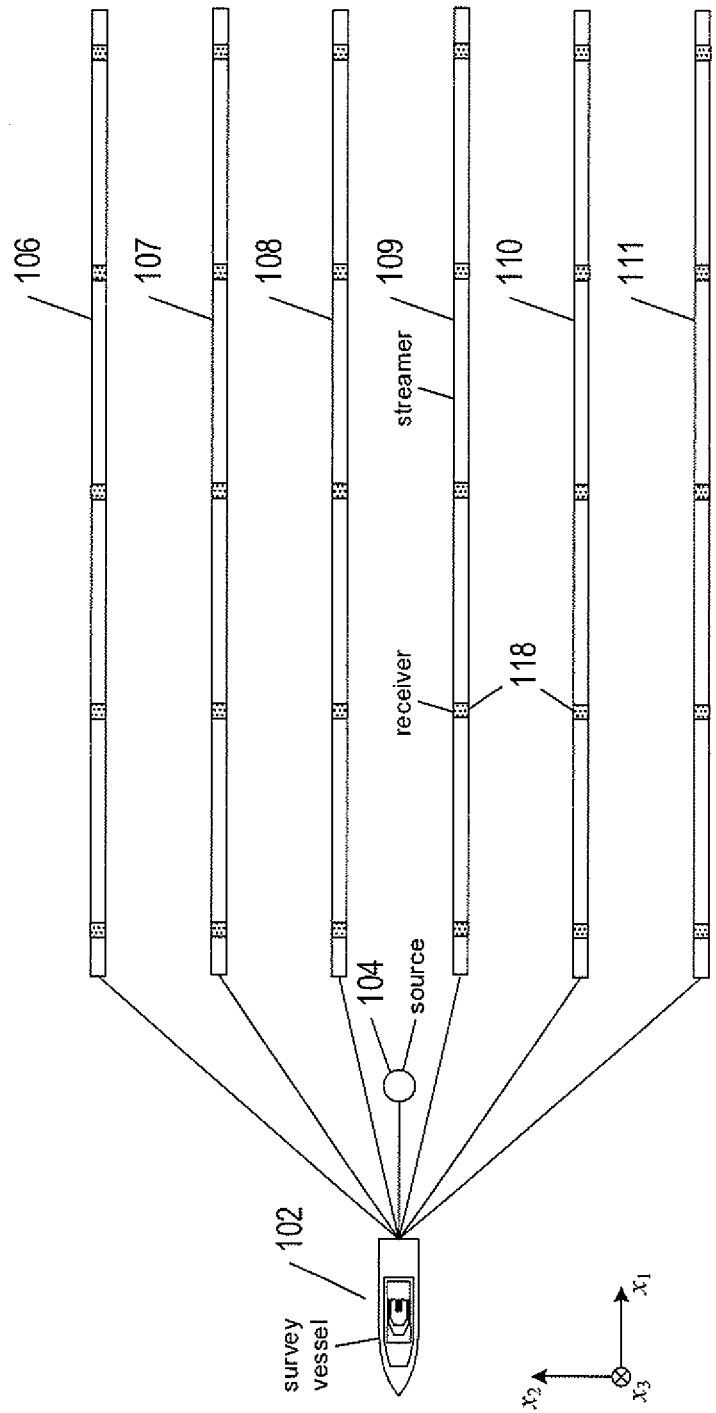

FIGS. 1A-1B show side-elevation and top views, respectively, of a marine seismic data acquisition system composed of an exploration seismology survey vessel 102 towing a source 104 and six separate streamers 106-111 beneath a free surface 112 of a body of water. The body of water can be a region of an ocean, a sea, a lake, or a river. In this example, each streamer is attached at one end to the survey vessel 102 via a streamer-data-transmission cable. The streamers 106-111 form a planar horizontal receiver acquisition surface with respect to the free surface 112. However, in practice, the receiver acquisition surface may be smoothly varying due to active sea currents and weather conditions. In other words, although the streamers 106-111 are illustrated in FIGS. 1A and 1B as being straight, in practice, the towed streamers may undulate as a result of dynamic conditions of the body of water in which the streamers are submerged. It should be noted that a receiver acquisition surface is not limited to having a planar horizontal orientation with respect to the free surface 112. The streamers may be towed at depths that orient the receiver acquisition surface at an angle with respect to the free surface 112 or so that one or more of the streamers are towed at different depths. It should also be noted that a receiver acquisition surface is not limited to six streamers as shown in FIG. 1B. In practice, the number of receivers used to form a receiver acquisition surface can range from as few as one streamer to as many as 20 or more streamers.

FIG. 1A includes an $x_1x_3$-plane 114 and FIG. 1B includes an $x_1x_2$-plane 116 of the same Cartesian coordinate system having three orthogonal, spatial coordinate axes labeled $x_1$, $x_2$ and $x_3$. The coordinate system is used to specify orientations and coordinate locations within a body of water. The $x_1$-direction specifies the position of a point in a direction parallel to the length of the streamers and is referred to as the "in-line" direction. The $x_2$-direction specifies the position of a point in a direction perpendicular to the $x_1$-direction and substantially parallel to the free surface 112 and is referred to as the "cross-line"direction. The $x_3$-direction specifies the position of a point perpendicular to the $x_1x_2$-plane (i.e., perpendicular to the free surface 112) with the positive $x_3$-direction pointing downward away from the free surface 112. Streamer depth below the free surface 112 can be estimated at various locations along the streamers using depth measuring devices attached to the streamers. For example, the depth measuring devices can measure hydrostatic pressure or utilize acoustic distance measurements. The depth measuring devices can be integrated with depth controllers, such as paravanes or water kites, that control and maintain the depth and position of the streamers as the streamers are towed through a body of water. The depth measuring devices are typically placed at intervals (e.g., about 300 meter intervals) along each streamer. Note that in other embodiments buoys may be used to maintain the orientation and depth of the streamers below the free surface 112.

In FIGS. 1A-1B, shaded rectangles 118 represent receivers or sensors that are spaced-apart along the length of each streamer. The streamers 106-111 are long cables containing power and data-transmission lines that connect the receivers 118 to seismic acquisition equipment located on board the survey vessel 102. Each receiver may be a dual sensor including a particle motion sensor that detects vertical displacement within the body of water over time by detecting particle motion, velocities or accelerations, and a pressure sensor that detects variations in water pressure over time.

FIG. 1A shows a cross-sectional view of the survey vessel 102 towing the source 104 and streamers above a subterranean formation 120. Curve 122 represents a surface of the subterranean formation 120. The subterranean formation 120 is composed of a number of subterranean layers of sediment and rock. Curves 124, 126, and 128 represent interfaces between subterranean layers of different compositions. A shaded region 130, bounded at the top by a curve 132 and at the bottom by a curve 134, represents a hydrocarbon-rich subterranean deposit, the depth and positional coordinates of which may be determined by analysis of seismic data collected during a marine seismic survey. As the survey vessel 102 moves over the subterranean formation 120 the source 104 produces an acoustic impulse at spatial and temporal intervals. In other embodiments, the source 104 may be towed by a separate survey vessel or a number of sources may be towed by a number of different vessels. Source 104 may be an air gun, marine vibrator, or an array of air guns and/or marine vibrators. FIG. 1A illustrates an acoustic impulse expanding outward from the source 104 as a pressure wavefield 136 represented by semicircles of increasing radius centered at the source 104. The wavefronts are, in effect, shown in vertical plane cross section in FIG. 1A. The outward and downward expanding portion of the pressure wavefield 136 is called the "primary wavefield," which eventually reaches the surface 122 of the subterranean formation 120, at which point the primary wavefield is partially reflected from the surface 122 and partially transmitted downward into the subterranean formation 120, becoming elastic waves within the subterranean formation 120. In other words, in the body of water, the acoustic impulse is composed of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves are partially reflected and partially refracted. As a result, each point of the surface 122 and each point of the interfaces within the underlying subterranean formation 120 becomes a potential secondary point source from which acoustic and elastic wave energy, respectively, may emanate upward toward the receivers 118 in response to the acoustic impulse generated by the source 104 and downward-propagating elastic waves generated from the pressure impulse. As shown in FIG. 1A, secondary waves of significant amplitude are generally emitted from points on or close to the surface 122, such as point 138, and from points on or very close to interfaces in the subterranean formation 120, such as points 140 and 142. Tertiary waves called "receiver ghosts" are produced by secondary waves that are reflected from the free surface 112 back towards the streamers 106-111 and the subterranean formation 120.

The secondary waves are generally emitted at different times within a range of times following the initial acoustic impulse. A point on the surface 122, such as the point 138, receives a pressure disturbance corresponding to the initial acoustic impulse more quickly than a point within the subterranean formation 120, such as points 140 and 142. Similarly, a point on the surface 122 directly beneath the source 104 receives the acoustic impulse sooner than a more distant-lying point on the surface 122. Thus, the times at which secondary and higher-order waves are emitted from various points within the subterranean formation 120 are related to the distance, in three-dimensional space, of the points from the source 104.

Acoustic and elastic waves, however, travel at different velocities within different materials as well as within the same material under different pressures. Therefore, the travel times of the primary wavefield and secondary wavefield emitted in response to the primary wavefield are functions of distance from the source 104 as well as the materials and physical characteristics of the materials through which the primary wave travels. In addition, the secondary expanding wavefronts may be altered as the wavefronts cross interfaces and as the velocity of sound varies in the media are traversed by the wave. The superposition of waves emitted from within the subterranean formation 120 in response to the primary wavefield is a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
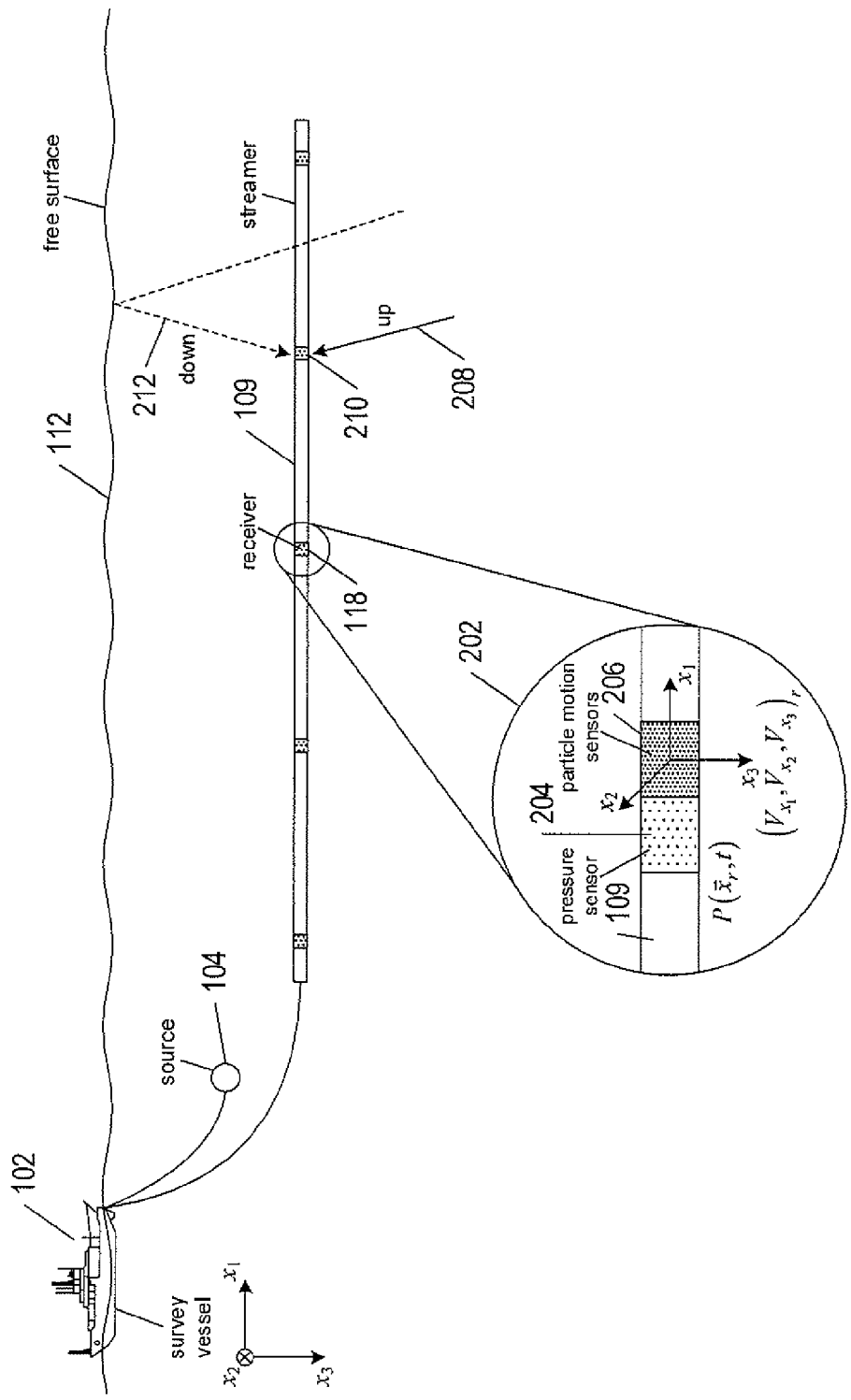
FIG. 2 shows a side-elevation view of the marine seismic data acquisition system with a magnified view of a receiver.

FIG. 2 shows a side-elevation view of the marine seismic data acquisition system with a magnified view 202 of receiver 118. The magnified view 202 reveals that the receiver 118 may be a multi-component sensor composed of a pressure sensor 204 and three particle motion sensors 206. The pressure sensor may be a hydrophone. The pressure sensor 204 measures changes in pressure over time and records pressure wavefield data denoted by $P(\vec{x}_r, t)$, where the subscript r is a receiver index, $\vec{x}_r$ are the coordinates of the receiver, and t represents time. The motion sensors 206 are responsive to water motion in different directions. For example, as shown in magnified view 202, three particle motion sensors 206 are collocated in the streamer 109 with the pressure sensor 204 to record particle motion wavefields in the $x_1$-, $x_2$-, and $x_3$-directions. The particle motion sensors may be responsive to the displacement of the particles, the velocity of the particles, or the acceleration of the particles in the water. For example, when the motion sensors 206 are responsive to position, the motion sensor data may be differentiated to obtain velocity wavefield data, and when the motion sensors are responsive to acceleration (i.e., MEMS accelerometers), the particle acceleration data may be integrated to obtain velocity wavefield data. In the example of FIG. 2, the resulting wavefield data produced by the motion sensors 206 are orthogonal velocity wavefields denoted by $V_{x_1}(\vec{x}_r, t)$, $V_{x_2}(\vec{x}_r, t)$, and $V_{x_3}(\vec{x}_r, t)$, which correspond to particle motion velocity wavefields in the $x_1$-, $x_2$-, and $x_3$-directions, respectively, at the receiver r and are collectively denoted by $(V_{x_1}, V_{x_2}, V_{x_3})_r$. The streamers 106-111 and the survey vessel 102 may include sensing electronics and data-processing facilities that allow measurements from each receiver to be correlated with absolute positions on the free surface 112 and absolute three-dimensional positions with respect to an arbitrary three-dimensional coordinate system. The pressure data and particle motion data represent pressure and particle motion wavefields.

In FIG. 2, directional arrow 208 represents the direction of an up-going wavefield detected by a receiver 210 and dashed arrows 212 represents a down-going wavefield produced by the up-going wavefield reflection from the free surface 112 before reaching the receiver 210. In other words, the pressure wavefield $P(\vec{x}_r, t)$ measured at a receiver is composed of an up-going pressure wavefield component and a down-going pressure wavefield component, and the $x_3$-component or vertical velocity wavefield $V_{x_3}(\vec{x}_r, t)$ measured at a particle motion sensor is composed of an up-going velocity wavefield component and a down-going velocity wavefield component. The down-going wavefield is called a receiver ghost that contaminates pressure and particle motion velocity data and creates notches in the spectral domain. Filtering is done to remove the down-going wavefields from the pressure and particle motion velocity data leaving the up-going wavefields which are used to generate images of the subterranean formation.

Each pressure sensor and particle motion sensor generates seismic data in the form of a time series that consist of a number of consecutive measured values called amplitudes separated in time by a sample period. The time series recorded by a pressure or motion sensor is called a "trace," which may consist of thousands of samples with a sample rate of about 1 to 5 samples/ms. A trace is a recording of a subterranean formation response to acoustic energy that passes from the source 104, through subterranean layers, and is ultimately recorded by a sensor. A trace records variations in a time-dependent amplitude that represents acoustic energy in the portion of the secondary wavefield measured by the sensor. A secondary wavefield typically arrives first at the receivers located closest to the source 104. The distance from the source 104 to a receiver is called the source-receiver offset, which creates a delay in the arrival time of a secondary wavefield from a substantially horizontal interface within the subterranean formation.

Figure 3:
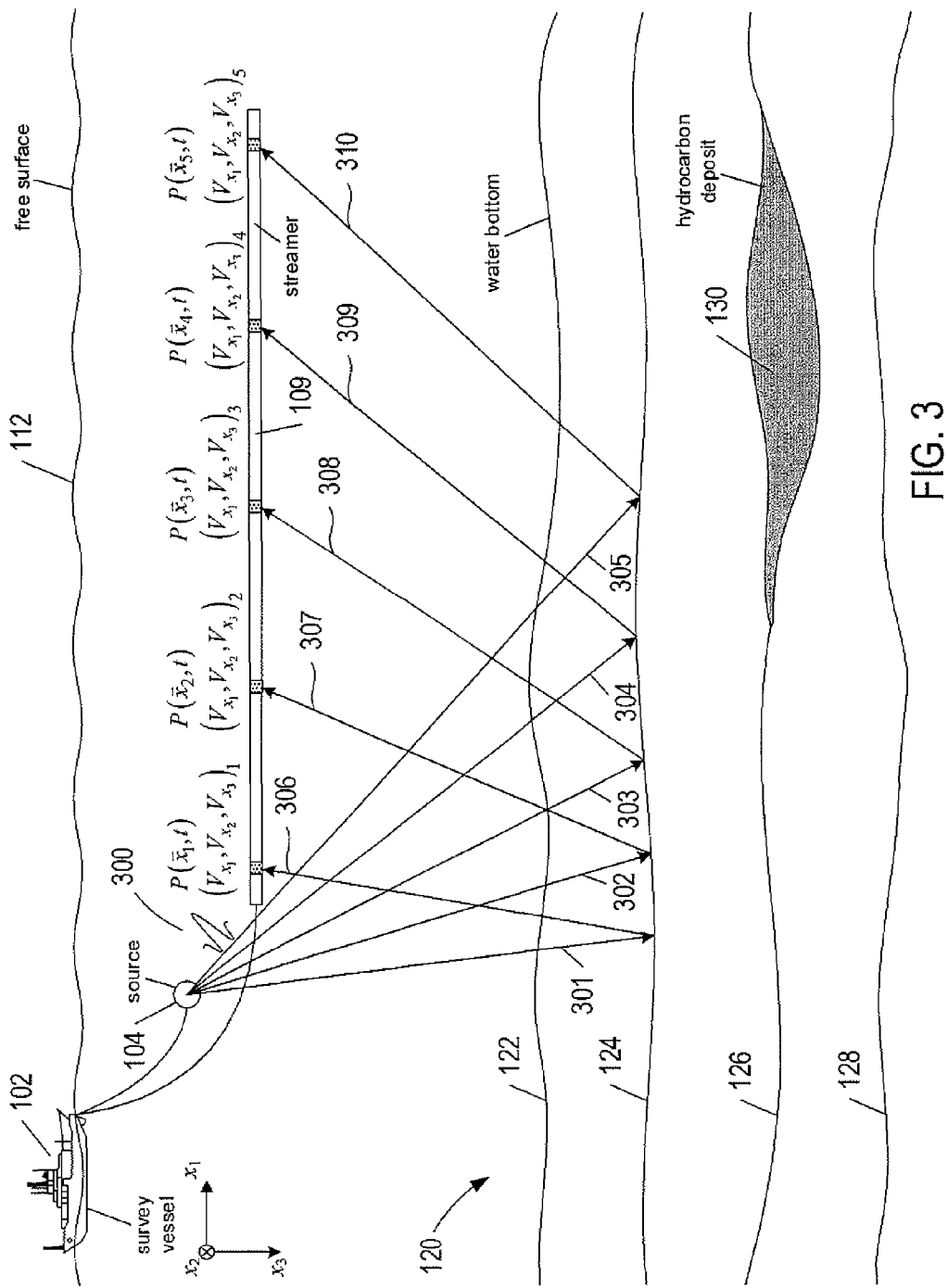
FIG. 3 shows ray paths that represent paths of an acoustic impulse output from a source to a subterranean interface.

FIG. 3 shows ray paths 301-305 that represent paths of an acoustic impulse 300 output from the source 104 to the interface 124. Rays 306-310 represent the paths of acoustic energy reflected from the interface 124 (i.e., secondary wavefields) to the receivers located along the streamer 109. Each pressure sensor measures the pressure wavefield $P(\vec{x}_r, t)$ and the motion sensors at each receiver measure particle motion velocity wavefields $V_{x_1}(\vec{x}_r, t)$, $V_{x_2}(\vec{x}_r, t)$, and $V_{x_3}(\vec{x}_r, t)$ of the acoustic energy reflected from the interface 124. The pressure wavefield $P(\vec{x}_r, t)$ and velocity wavefields $(V_{x_1}, V_{x_2}, V_{x_3})_r$ measured at each rceiver r are time sampled, as described in greater detail below, and recorded as four separate traces. A number of traces taken together either from the same streamer or across the streamers can be used to form a gather, which represents a portion of a measured wavefield. For example, the traces associated with the pressure $P(\vec{x}_r, t)$ wavefield measured at the five pressure sensors located along the streamer 109 can be used to form a shot-receiver gather that represents an in-line pressure wavefield, and the traces associated with the velocity wavefield $V_{x_3}(\vec{x}_r, t)$ measured at the five particle motion sensors located along the streamer 109 can be used to form a shot-receiver gather that represents an in-line vertical velocity wavefield. Other types of gathers can be formed from the pressure and velocities including common-receiver gathers and common-midpoint gathers.

Figure 4:
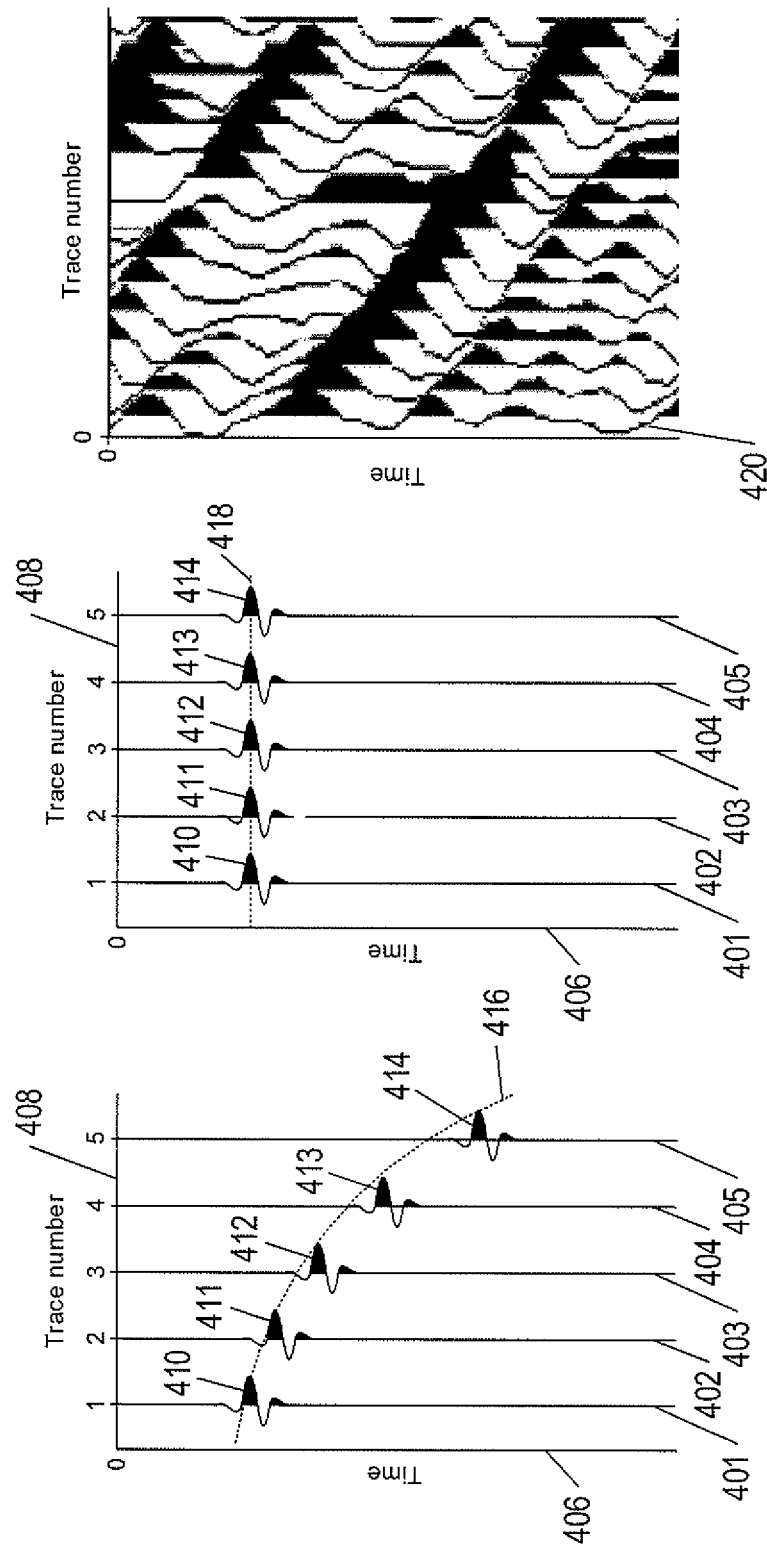
FIGS. 4A-4C shows plots of example gathers.

FIG. 4A shows a plot of a source-receiver gather of example traces 401-405 of the acoustic energy reflected from the interface 124 and recorded by the five receives located along the streamer 109 shown in FIG. 3. Vertical axis 406 represents time and horizontal axis 408 represents trace numbers with trace "1" representing the seismic data generated by the receiver located closest to the source 104 and trace "5" representing the seismic data generated by the receiver located farthest from the source 104. The traces 401-405 can represent variation in the amplitude of the pressure wavefield $P(\vec{x}_r, t)$ or variation in amplitude of any one of the velocity wavefield components $V_{x_1}(\vec{x}_r, t)$, $V_{x_2}(\vec{x}_r, t)$, and $V_{x_3}(\vec{x}_r, t)$. The example traces include wavelets or pulses 410-414 that represent the acoustic energy reflected from the interface 124. Peaks, colored black, and troughs of each trace represent changes in the amplitude measured by the pressure sensors or motion sensors. The distances along the traces 401-405 from the trace number axis 408 to the wavelets 410-414 represents the travel time of the acoustic energy output from the source 104 to the interface 124 and ultimately to the receivers. The amplitude of the peak or trough of the wavelets 410-414 indicates the magnitude of acoustic energy recorded by the pressure sensor or motion sensor. Note that the arrival times versus source-receiver offset is longer with increased source-receiver offset and, in this example, has a hyperbolic shape 416.

The traces from different source-receiver pairs may be corrected during seismic data processing to remove the effects of different source-receiver offsets in a process called "normal moveout" ("NMO"). FIG. 4B shows a gather of the traces 410-414 after NMO has been applied to align the pulses in time as represented by horizontal line 418. After NMO corrections, traces from different shot records with a common reflection point can be stacked to form a single trace during seismic data processing. Stacking improves the signal-to-noise ratio, reduces noise, improves seismic data quality, and reduces the amount of data.

A typical trace does not represent a single reflection from a single interface, as represented in FIGS. 4A-4B. In practice, a trace represents the time-dependant amplitude of acoustic energy associated with numerous reflections of acoustic energy from within the subterranean formation. FIG. 4C shows a gather of 15 traces recorded over a period of time. Each trace, such as trace 420, varies in amplitude over time and represents acoustic energy reflected from a number of different interfaces within a subterranean formation as measured by a pressure sensor or a motion sensor. The gather shown in FIG. 4C can represent a pressure wavefield or a velocity wavefield and can be a source-receiver gather, a common-receiver gather, or a common-midpoint gather.

Systems and Methods for Time-Dependent Interpolation

Figure 5:
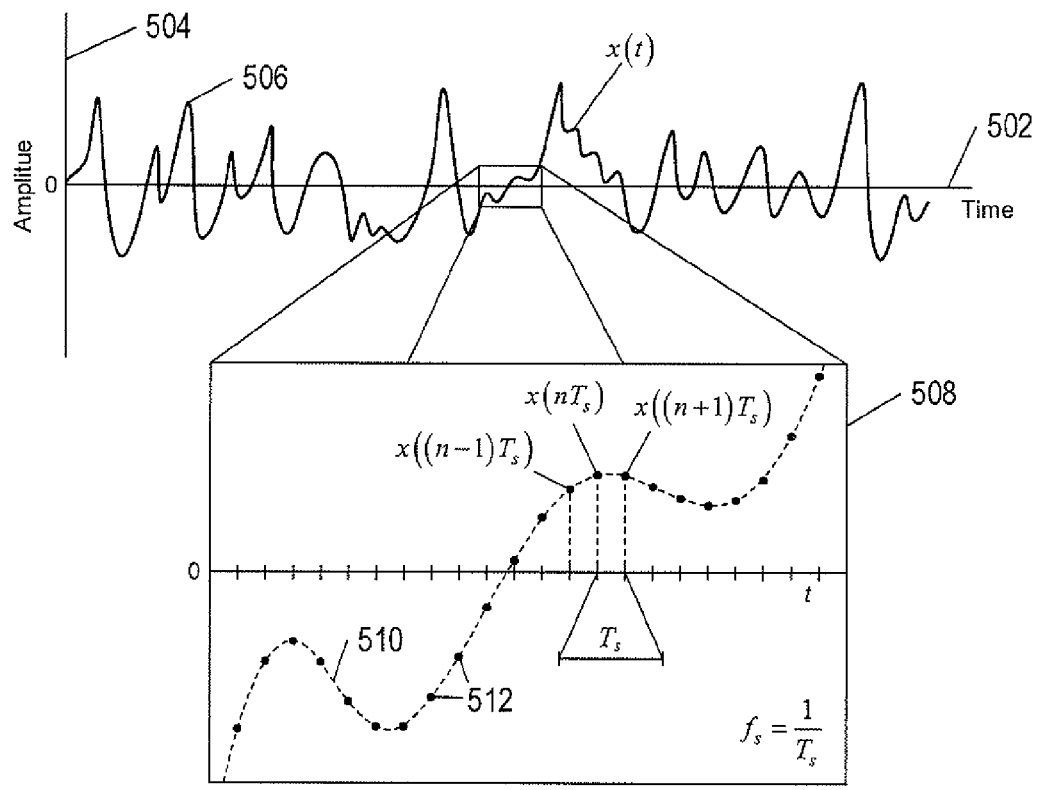
FIG. 5 shows a time-domain plot of an example time-dependent continuous signal.

FIG. 5 shows a time-domain plot of an example time-dependent continuous signal denoted by x(t). Horizontal axis 502 represents time denoted by t, vertical axis 504 represents the signal amplitude, and curve 506 represents the signal x(t). The signal x(t) can represent time-dependent variations in the pressure wavefield P(t), the particle motion wavefield, or time-dependent variations in the velocity wavefields $V_{x_1}(t)$, $V_{x_2}(t)$, and $V_{x_3}(t)$ measured at a receiver r, where in the following description the receiver coordinates $\vec{x}_r$ are suppressed. The signal x(t) is typically sampled and recorded at regularly spaced times separated by time intervals called "sample periods" denoted by $T_s$. FIG. 5 includes a magnified view 508 of a segment of the signal x(t). Dashed line 510 represents the continuous signal x(t) and solid dots 512 represent the amplitude of the signal x(t) recorded at regularly spaced time intervals equal to the sample period $T_s$. The reciprocal or inverse of the sample period $T_s$ is the sample rate or sample frequency denoted by $f_s$ (i.e., $f_s=1/T_s$), which is the number of samples recorded per unit of time of the continuous signal x(t) to form a discrete signal denoted by $x(nT_s)$, where n is an integer time sample index. The notation $x(nT_s)$ can also be used to represent to the samples comprising the discrete signal. For example, magnified view 508 includes time samples $x((n-1)T_s)$, $x(nT_s)$, and $x((n+1)T_s)$ that are recorded at regularly spaced times $(n-1)T_s$, $nT_s$, and $(n+1)T_s$ separated by the same sample period $T_s$. Because the discrete signal $x(nT_s)$ can represent a time-sample pressure wavefield recorded by a pressure sensor or a velocity wavefield recorded by a motion sensor, the discrete signal $x(nT_s)$ is a trace as described above.

The signal x(t) is effectively band-limited because of various environmental, source and recording factors that limit the frequency content of the signal. The signal x(t) is called B-band limited when its associated energy is finite and its Fourier transform X(ω) vanishes outside the interval (−B, B):

$$X(\omega) = 0, \text{ for } |\omega| \geq B \quad (1)$$

$$\int_{-\infty}^{\infty} |x(t)|^2 \, dt = \frac{1}{2\pi} \int_{-B}^{B} |X(\omega)|^2 \, d\omega < \infty \quad (2)$$

In other words, the signal x(t) and its Fourier transform X(ω) are square-integrable functions with an inverse Fourier transform:

$$x(t) = \frac{1}{2\pi} \int_{-B}^{B} X(\omega) e^{j\omega t} \, d\omega \quad (3)$$

The band limit of a trace is revealed when the trace is transformed to the spectral domain. For example, a Fourier transform ("FT") can be used to transform the trace $x(nT_s)$ to the spectral domain:

$$x(nT_s) \xrightarrow{FT} X(\omega_k) \quad (4)$$

where
$X(\omega_k)$ is the frequency spectrum of $x(nT_s)$;
$\omega_k$=fk is the kth frequency sample;
k is an integer frequency sample index;
$f=2\pi/NT_s$ is the frequency sampling interval; and
N is the number of time or frequency samples.

Figure 6:
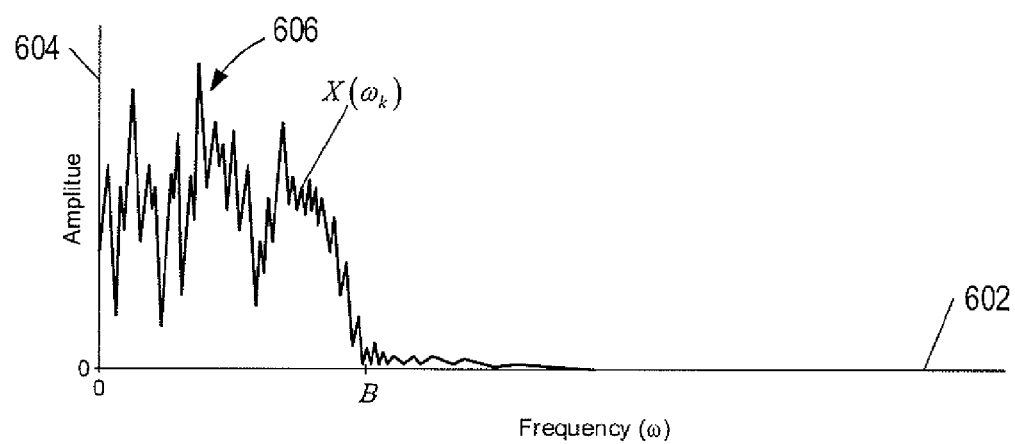
FIG. 6 shows a spectral domain plot of an example frequency spectrum.

In practice, a fast Fourier transform ("FFT") can be used for computational efficiency and speed. FIG. 6 shows a spectral domain plot of an example frequency spectrum resulting from transforming the trace $x(nT_s)$ represented in FIG. 5 to the spectral domain. Horizontal axis 602 represents the frequency ω, vertical axis 604 represents the spectral amplitude, and jagged-curve 606 represents the B-band limited frequency spectrum $X(\omega_k)$ of the trace $x(nT_s)$. Point B along the frequency axis 602 represents a finite frequency beyond which the spectrum $X(\omega_k)$ is essentially zero. Any signal that has a Fourier transform, or frequency spectrum, that is essentially zero for frequencies greater than a finite frequency B is called "band limited" and the frequency B is called the "band limit."

The signal x(t) can be interpolated or reconstructed from its samples $x(nT_s)$ when each sample is considered as specifying the scaling and location of a sinc function. In other words, from sampling theory, interpolation can be used to interpolate the signal x(t) in terms of the time samples $x(nT_s)$ as follows:

$$x(t) = \sum_{n=-\infty}^{\infty} [x(nT_s)\text{sinc}(B(t - nT_s))] \quad (5)$$

where $$T_s = \pi/B;$$

and $$\text{sinc}(B(t - nT_s)) = \frac{\sin B(t - nT_s)}{B(t - nT_s)}$$

Equation (5) is called "the sampling theorem." In order to avoid temporal aliasing (i.e., losing signal information as a result of sampling), the signal x(t) must be band limited to less than half the sample rate $f_s$. In other words, there can be no energy in the signal x(t) at frequencies greater than $f_{N/2}$, which is the band limited frequency B (i.e., $B=f_N/2$) and $f_N$ is the minimum sample rate called the "Nyquist rate." Therefore, as long as the sample rate $f_s$ is greater than or equal to the Nyquist rate, $f_N=2B$, of the signal x(t) can be interpolated from the samples $x(nT_s)$ using Equation (5). The Nyquist rate $f_N$ is a lower bound on the sample rate $f_s$ to avoid temporal aliasing.

A signal can also be interpolated at sample rates approaching half the Nyquist rate when the samples and the time derivatives of the samples are known using:

$$x(t) = 4\sin^2\left(\frac{Bt}{2}\right) \sum_{n=-\infty}^{\infty} \left[ \frac{x(nT)}{(Bt - 2n\pi)^2} + \frac{\partial_t x(nT)}{B(Bt - 2n\pi)} \right] \quad (6)$$

where
$\partial_t$ represents the time derivative; and
$T=2\pi/B$.

In other words, given the samples x(nT) and their associated time derivatives $\partial_t x(nT)$, the signal x(t) can be interpolated using Equation (6) with a sample rate greater than or equal to half the Nyquist rate (i.e., $f_N/2$).

Figure 7:
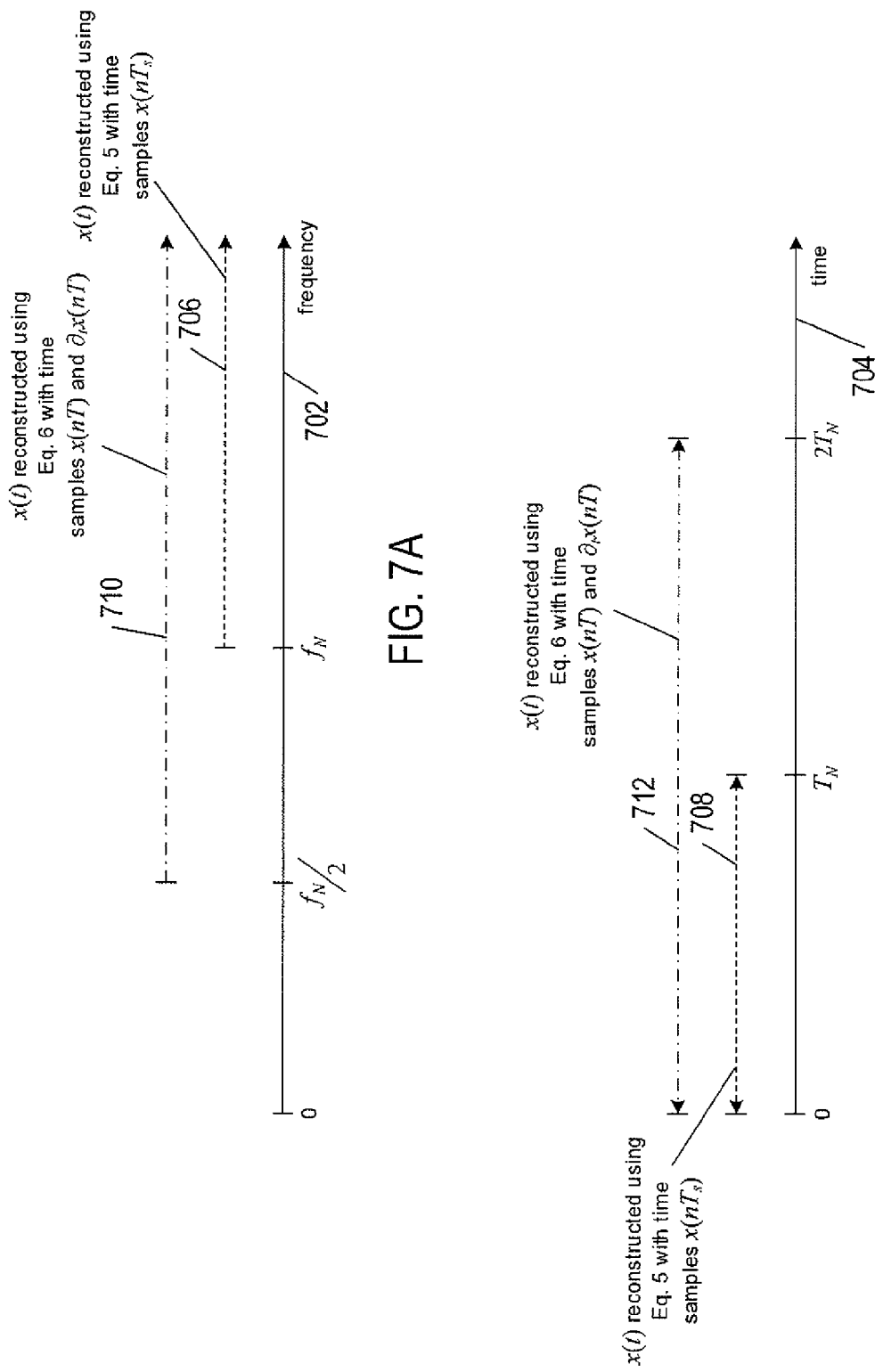
FIGS. 7A-7B show horizontal axes that represent frequency and time sample domains.

FIG. 7A shows a horizontal axis 702 that represents frequencies greater than zero, and FIG. 7B shows a horizontal axis 704 that represents time greater than zero. Dashed directional arrow 706 represents sample rates that are greater than or equal to the Nyquist rate, $f_N$, and dashed directional arrow 708 represents corresponding sample periods between zero and a Nyquist period denoted by $T_N=1/f_N$. The signal x(t) can be interpolated using Equation (5) with just the samples $x(nT_s)$ produced at a sample rate $f_s$ greater than the Nyquist rate and sample periods $T_s$ that lie between zero and the Nyquist period $T_N$. Dot-dashed directional arrow 710 represents sample rates $f_R$ that are greater than or equal to half the Nyquist rate, $f_N/2$, and dot-dashed directional arrow 712 represents corresponding sample periods T between zero and twice the Nyquist period $T_N$. In this case, the signal x(t) can be interpolated using Equation (6) with samples x(nT) and time derivatives of the samples $\partial_t x(nT)$ at a sample rate $f_R$ greater than $f_N/2$ (i.e., $f_R > f_N/2$). In other words, Equation (6) allows for reconstruction of the signal x(t) with samples x(nT) and time derivatives of the samples $\partial_t x(nT)$ recorded at a sample rate $f_R$ between $f_N/2$ and $f_N$ (i.e., $f_N > f_R > f_N/2$) and sample period T between $T_N$ and $2T_N$ (i.e., $T_N < T < 2T_N$).

FIGS. 7A-7B illustrate how Equation (6) can be used to reduce the number of samples to less than half the number of samples recorded with a typical sample rate used to record seismic data provided the sample data and the time derivative of the sample data are known. For example, suppose the Nyquist rate for recording a pressure wavefield P(t) is about 3.5 samples/ms. In order to avoid temporal aliasing in the trace $P(nT_s)$, a typical sample rate of about 4 samples/ms can be used and the pressure wavefield P(t) can be interpolated from just the pressure samples $P(nT_s)$ using Equation (5). By contrast, according to Equation (6), the sample rate can be reduced to a sample rate greater than half the Nyquist rate of 1.75 Hz, and the pressure signal P(t) can be interpolated provided the pressure samples P(nT) and time derivatives of the pressure samples $\partial_t P(nT)$ are known for each time sample. In other words, Equation (6) enables interpolation of a time-dependent pressure wavefield with about half the number of samples typically used to record pressure data, provided pressure samples and corresponding time derivatives of the pressure samples are recorded for each time sample.

The time derivatives of the pressure wavefield can be calculated from the velocity wavefields. Consider the basic wave equations, which comprise the equation of motion and the equation of deformation, respectively, given by:

$$\partial_j P(t) + \rho \partial_t V_j(t) = f_j \quad (7a)$$

$$\sum_{j=1}^{3} \partial_j V_j(t) + \kappa \partial_t P(t) = q \quad (7b)$$

where

P(t) is the pressure wavefield measured at a receiver r;

subscript j represents orthogonal spatial directions $x_1$, $x_2$, or $x_3$;

$V_j(t)$ is the velocity wavefield measured at the receiver r in spatial direction j;

$\rho$ is the density of a volume of water in which the receiver r is submerged;

$\kappa$ is the compressibility of the water;

q is the volume source density of injection rate; and $f_j$ is the volume source density of volume force in the spatial direction $x_j$.

When the volume of water is without sources, q=0 and $f_j=0$ in Equations (7a) and (7b), and the time derivative of the pressure wavefield P(t) can be expressed in terms of the divergence of the velocity wavefield using Equation (7b) as follows:

$$\partial_t P(t) = \kappa^{-1} \sum_{j=1}^{3} \partial_j V_j(t) \quad (8)$$

From Equation (7b), the time derivative of the pressure wavefield can also be expressed in terms of the velocity wavefield as follows:

$$\partial_t P(t) = \frac{\partial P(t)}{\partial t} = \sum_{j=1}^{3} \frac{\partial j}{\partial t} \frac{\partial P(t)}{\partial j} = \sum_{j=1}^{3} \frac{\partial j}{\partial t} \partial_j P(t) = \sum_{j=1}^{3} \frac{\partial j}{\partial t} (-\rho \partial_t V_j(t)) \quad (9)$$

The measurements of P(t) and $V_j(t)$ are recorded by sensors in a streamer with known properties that can be considered as a locally homogenous time-invariant medium, or is dragged through a water layer with similar properties that are known, or can be measured independently. The time derivative $\partial j / \partial t$ in Equation (9) is proportional to the velocity of sound in water c, which is given by $c=(\rho K)^{-1/2}$. As a result, from Equation (9), the time derivative of the pressure in a homogeneous medium reduces to:

$$\partial_t P(t) \cong -c\rho \sum_{j=1}^{3} \partial_t V_j(t) \quad (10)$$

In other words, when the multi-component velocity samples $V_{x_1}(nT)$, $V_{x_2}(nT)$, and $V_{x_3}(nT)$ and the pressure samples P(nT) are known are known for a receiver r, an expression for interpolating the pressure wavefield at the receiver r can be obtained by substituting Equation (10) into Equation (6) to give:

$$P(t) \cong 4\sin^2\left(\frac{Bt}{2}\right) \sum_{n=-\infty}^{\infty} \left[ \frac{P(nT)}{(Bt-2n\pi)^2} - \frac{c\rho \sum_{j=1}^{3} \partial_t V_j(nT)}{B(Bt-2n\pi)} \right] \quad (11)$$

where $0 < T \le 2T_N$; and the same sample frequency $f_R \ge f_N/2$ is used to sample the pressure wavefield and the vertical velocity wavefield.

Typically, the seismic reflection data of interest are the up-going or vertically travelling wavefields (i.e., $x_3$-direction). As a result, the time derivative of the pressure wavefield in Equation (10) can be approximated by:

$$\partial_t P(t) \cong -c\rho \partial_t V_3(t) + n_h \quad (12)$$

where $n_h$ represents noise that depends on the horizontal particle velocity components $V_{x_1}(t)$ and $V_{x_2}(t)$.

When the noise $n_h$ is small (i.e., $n_h \ll 1$), the pressure wavefield P(t) can be interpolated by substituting Equation (12) into Equation (6) to obtain:

$$P(t) \cong 4\sin^2\left(\frac{Bt}{2}\right) \sum_{n=-\infty}^{\infty} \left[\frac{P(nT)}{(Bt-2n\pi)^2} - \frac{c\rho\partial_t V_3(nT)}{B(Bt-2n\pi)}\right] \quad (13)$$

where $0 < T \leq 2T_N$; and the same sample frequency $f_R \geq f_N/2$ is used to sample the pressure wavefield and the vertical velocity wavefield.

Figure 8:
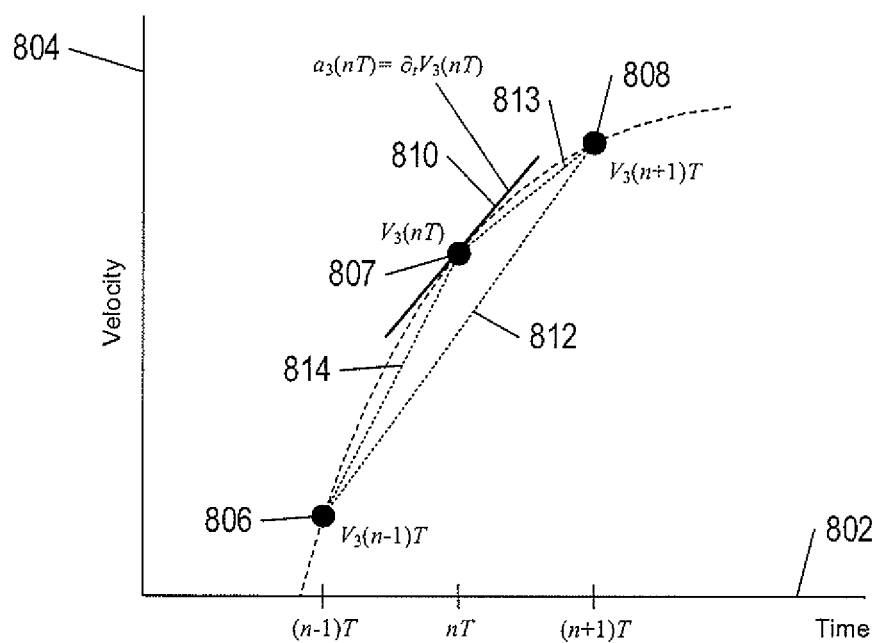
FIG. 8 shows a plot of three consecutive example vertical velocity samples.

As shown above, Equation (11) depends on time derivatives of the velocities $V_1(nT)$, $V_2(nT)$, and $V_3(nT)$ and Equation (13) depends on time derivatives of the velocity $V_3(nT)$, which are particle motion accelerations. For example, the time derivative of the vertical velocity, $\partial_t V_3(nT)$, is also the particle motion acceleration given by $a_3(nT) = \partial_t V_3(nT)$. The particle motion acceleration can be determined in a number ways. For example, the particle motion sensors deployed at the receivers can be MEMS accelerometers that output sampled acceleration $a_3(nT)$, which is time sampled at substantially the same sample rate $f_R$ as the pressure wavefield. Alternatively, the acceleration can be calculated from the slope of the recorded vertical velocity samples surrounding the sample $V_3(nT)$. FIG. 8 shows a plot of three consecutive example vertical velocity samples. Horizontal axis 802 represents time, vertical axis 804 represents velocity, and shaded dots 806-808 represent vertical velocity samples $V_3((n-1)T)$, $V_3(nT)$, and $V_3((n+1)T)$, respectively. The acceleration $a_3(nT)$ at time sample nT is the slope of a tangent line 810 at the point 807. The acceleration $a_3(nT)$ can be approximated from the neighboring vertical velocity samples $V_3((n-1)T)$, $V_3(nT)$, and $V_3((n+1)T)$ as follows:

$$a_3(nT) \cong \frac{V_3((n+1)T) - V_3((n-1)T)}{2T} \quad (14a)$$

$$a_3(nT) \cong \frac{V_3((n+1)T) - V_3(nT)}{T} \quad (14b)$$

$$a_3(nT) \cong \frac{V_3(nT) - V_3((n-1)T)}{T} \quad (14c)$$

The accelerations in Equations (14a)-(14c) are represented by slopes of dotted lines 812-814, respectively. Similar equations can be used to calculate approximate accelerations $a_1(nT)$ and $a_2(nT)$ in the in-line and cross-line directions in Equation (11).

Figure 9:
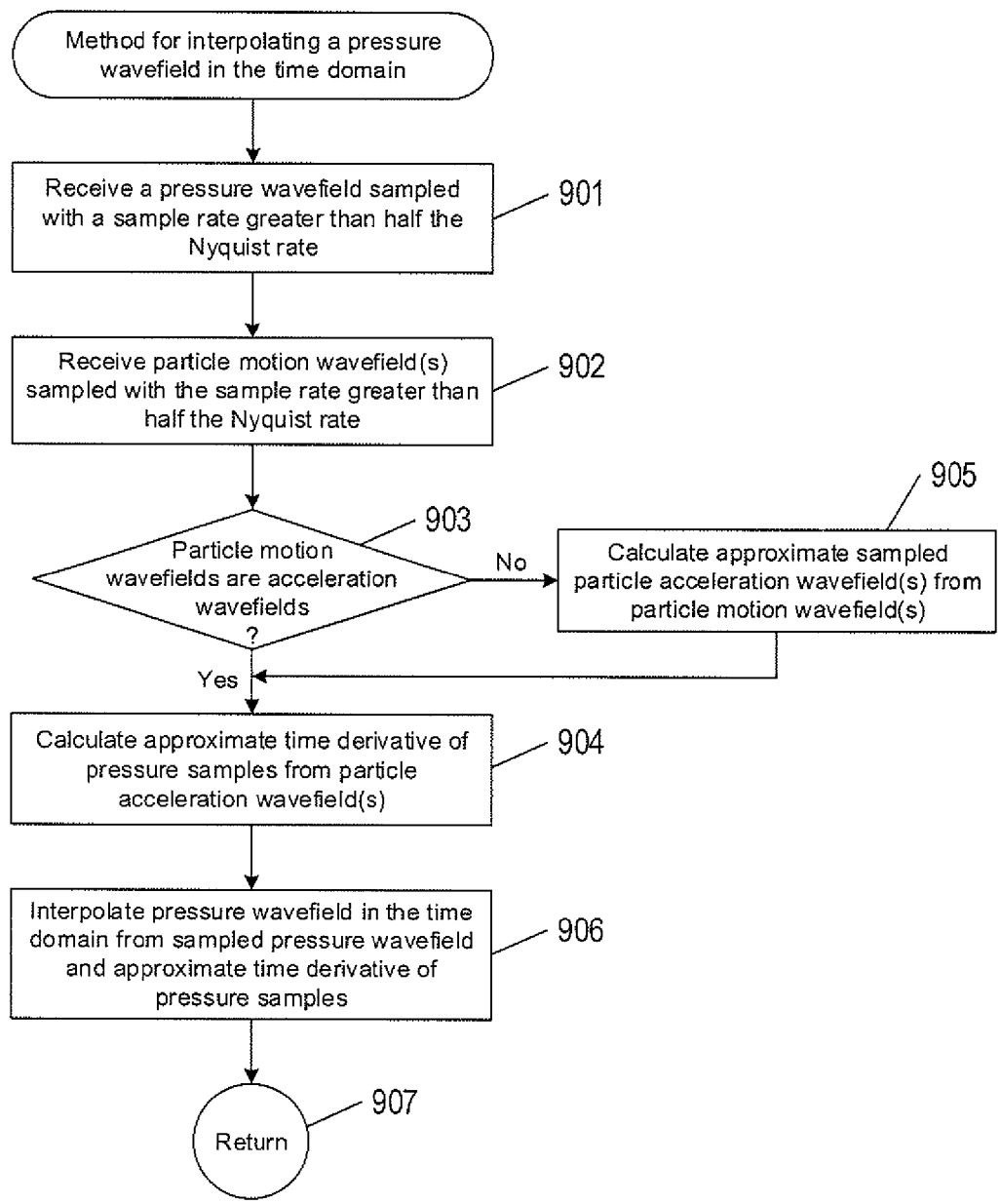
FIG. 9 shows a flow diagram of a method for interpolating a pressure wavefield in the time domain.

FIG. 9 shows a flow diagram of a method for interpolating a pressure wavefield in the time domain. In block 901, pressure wavefield samples P(nT) sampled with a sample rate $f_R$ greater than or equal to half the Nyquist rate $f_N$ are received. The samples P(nT) may be pressure sensors located at a receiver r along a streamer towed by a survey vessel as described above. In block 902, one or more particle motion wavefields that are sampled at the sample rate $f_R$ are received. The particle motion wavefields are recorded by particle motion sensors collocated with the pressure sensor. When the motion sensors are responsive to position, the particle motion wavefields may be differentiated to convert the wavefield data into velocity wavefields $V_1(nT)$, $V_2(nT)$, and $V_3(nT)$, and when the motion sensors are responsive to acceleration (i.e., MEMS accelerometers), the particle motion wavefields are acceleration wavefields $a_{x_1}(nT)$, $a_{x_2}(nT)$, and $a_{x_3}(nT)$. In block 903, when the particle motion wavefields are acceleration wavefields, control flow to block 904, otherwise, control flows to block 905. In block 905, acceleration wavefields are calculated from the velocity wavefields as described above with reference to Equations (14a)-(14c). In block 904, a time derivative for the pressure sample $\partial_t P(nT)$ is calculated according to Equation (10) or Equation (12). In block 906, the pressure wavefield is interpolated from the pressure samples P (nT) and the approximate time derivatives for the pressure sample $\partial_t P(nT)$ using Equation (11) or Equation (12). In block 907, the method returns to a calling module.

Figure 10:
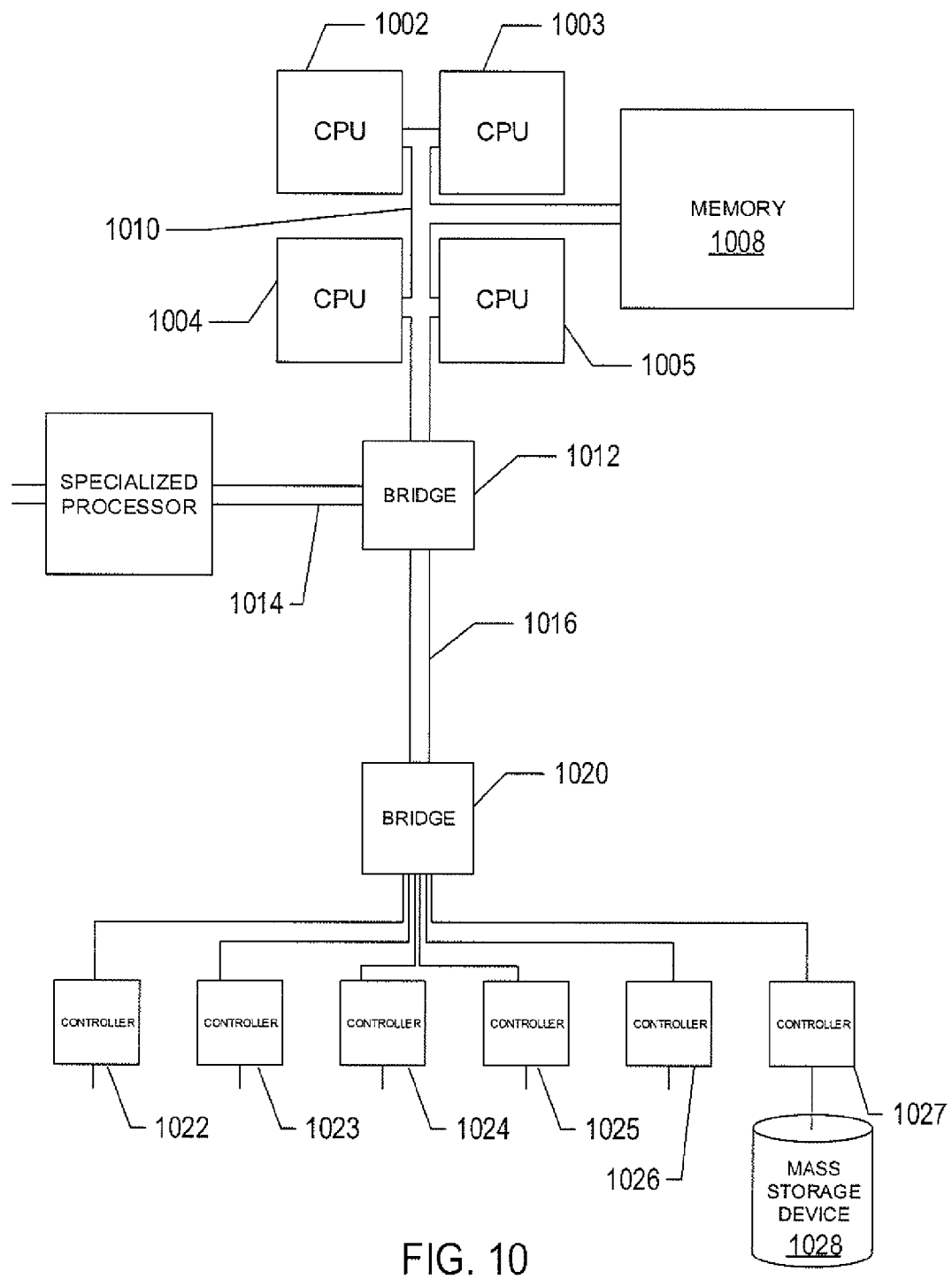
FIG. 10 shows an example of a generalized computer system that executes efficient methods for interpolating the pressure wavefield in the time domain.

FIG. 10 shows an example of a generalized computer system that executes efficient methods for interpolating the pressure wavefield in the time domain and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1002-1005, one or more electronic memories 1008 interconnected with the CPUs by a CPU/memory-subsystem bus 1010 or multiple busses, a first bridge 1012 that interconnects the CPU/memory-subsystem bus 1010 with additional busses 1014 and 1016, or other types of high-speed interconnection media, including multiple, high-speed serial interconnects. The busses or serial interconnections, in turn, connect the CPUs and memory with specialized processors, such as a graphics processor 1018, and with one or more additional bridges 1020, which are interconnected with high-speed serial links or with multiple controllers 1022-1027, such as controller 1027, that provide access to various different types of computer-readable media, such as computer-readable medium 1028, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1028 is a data-storage device, including electronic memory, optical or magnetic disk drive, USB drive, flash memory and other such data-storage device. The computer-readable medium 1028 can be used to store machine-readable instructions that encode the computational methods described above and can be used to store encoded data, during store operations, and from which encoded data can be retrieved, during read operations, by computer systems, data-storage systems, and peripheral devices.

Embodiments described above are not intended to be limited to the descriptions above. For example, any number of different computational-processing-method implementations that carry out the interpolation methods described above may be designed and developed using various different programming languages and computer platforms and by varying different implementation parameters, including control structures, variables, data structures, modular organization, and other such parameters. The computational representations of wavefields, operators, and other computational objects may be implemented in different ways. The systems and methods for interpolating seismic data can be executed in near-real time while conducting a marine survey of a subterranean formation. The term "near-real time" refers to a time delay due to data transmission and data processing that is short enough to allow timely use of the processed data during further data acquisition. For example, near-real time can refer to a situation in which the time delay due to transmission and processing is insignificant. In other words, near-real time approximates real time when the time for data transmission and data processing appears imperceptible. Near-real time can also refer to a perceptible time delay for data transmission and data processing but the time delay is not so long that quality control cannot be executed.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method to generate an image of a subterranean formation using a programmable computer programmed to at least perform the operations of:
    recording pressure wavefield samples of a pressure wavefield measured with pressure sensors at a sample rate between a Nyquist rate and one half of the Nyquist rate;
    recording acceleration wavefield samples of a particle motion wavefield with particle motion sensors at the sample rate;
    interpolating a pressure wavefield in a time domain based on the pressure wavefield samples and the acceleration wavefield samples
    filtering the pressure wavefield and interpolated pressure wavefield to obtain an up-going pressure wavefield; and
    generating an image of a subterranean formation based at least in part on the up-going pressure wavefield.

2. The method of claim 1, wherein one half of the Nyquist rate is a lower bound for the pressure wavefield samples alone.

3. The method of claim 2, wherein the sample rate is less than the Nyquist rate and is greater than one half of the Nyquist rate.

4. The method of claim 1, further comprises calculating the acceleration wavefield samples as time derivatives of vertical velocity wavefield samples of a vertical velocity wavefield measured with a particle motion sensor sampled at the sample rate.

5. The method of claim 1, wherein interpolating the pressure wavefield in the time domain further comprises interpolating the pressure wavefield as a function of the pressure wavefield samples and time derivatives of vertical velocity wavefield samples, wherein the time derivatives of the vertical velocity wavefield samples are the acceleration wavefield samples.

6. The method of claim 1, wherein the pressure sensor and the particle motion sensor are collocated in a streamer.

7. The method of claim 1, wherein interpolating the pressure wavefield in the time domain further comprises calculating the pressure wavefield as a function of the pressure wavefield samples and the acceleration wavefield samples as a sum of time derivatives of velocity wavefield samples measured at the sample rate with three orthogonal particle motion sensors.

8. A system to generate an image of a subterranean formation, the system comprising:
    one or more processors;
    one or more data-storage devices; and
    a routine stored in one or more of the one or more data-storage devices and executed by the one or more processors, the routine directed to:
        retrieving pressure wavefield samples recorded in the one or more data-storage devices at a sample rate between a Nyquist rate and one half of the Nyquist rate;
        retrieving acceleration wavefield samples recorded in the one or more data-storage devices at the sample rate;
        interpolating a pressure wavefield in a time domain based on the pressure wavefield samples and the acceleration wavefield samples;
        filtering the pressure wavefield and interpolated pressure wavefield to obtain an up-going pressure wavefield; and
        generating an image of a subterranean formation based at least in part on the up-going pressure wavefield.

9. The system of claim 8, wherein one half of the Nyquist rate is a lower bound for the pressure wavefield samples alone.

10. The system of claim 9, wherein the sample rate is less than the Nyquist rate and is greater than half the Nyquist rate.

11. The system of claim 8, further comprises calculating the acceleration wavefield samples as time derivatives of vertical velocity wavefield samples of a vertical velocity wavefield measured with a particle motion sensor sampled at the sample rate.

12. The system of claim 8, wherein interpolating the pressure wavefield in the time domain further comprises interpolating the pressure wavefield as a function of the pressure wavefield samples and time derivatives of the vertical velocity wavefield samples, wherein the time derivatives of the vertical velocity wavefield samples are the acceleration wavefield samples.

13. The system of claim 8, further comprises receiving the pressure wavefield samples, receiving the particle motion wavefields, and interpolating the pressure wavefield in near-real time on board a survey vessel.

14. The system of claim 8, wherein interpolating the pressure wavefield in the time domain further comprises calculating the pressure wavefield as a function of the pressure wavefield samples and the acceleration wavefield samples as a sum of time derivatives of velocity wavefield samples measured at the sample rate with three orthogonal particle motion sensors.

15. A non-transitory computer-readable medium having machine-readable instructions encoded thereon for enabling one or more processors of a computer system to perform the operations of
    receiving pressure wavefield samples of a pressure wavefield measured by pressure sensors located in a streamer at a sample rate between a Nyquist rate and one half of the Nyquist rate;
    receiving acceleration wavefield samples measured by particle motion sensors at the sample rate;
    interpolating a pressure wavefield in a time domain based on the pressure wavefield samples and the acceleration wavefield samples;
    filtering the pressure wavefield and interpolated pressure wavefield to obtain an up-going pressure wavefield; and
    generating an image of a subterranean formation based at least in part on the up-going pressure wavefield.

16. The medium of claim 15, wherein one half of the Nyquist rate is a lower bound for the sample rates the pressure wavefield samples alone.

17. The medium of claim 16, wherein the sample rate is less than the Nyquist rate and is greater than one half of the Nyquist rate.

18. The medium of claim 15, wherein interpolating the pressure wavefield in the time domain further comprises calculating the acceleration wavefield samples as time derivatives of vertical velocity wavefield samples of a vertical velocity wavefield measured with a particle motion sensor sampled at the sample rate.

19. The medium of claim 15, wherein interpolating the pressure wavefield in the time domain further comprises interpolating the pressure wavefield as a function of the pressure wavefield samples and time derivatives of the vertical velocity wavefield samples, wherein the time derivatives of the vertical velocity wavefield samples are the acceleration wavefield samples.

20. The medium of claim 15, wherein interpolating the pressure wavefield in the time domain further comprises calculating the pressure wavefield as a function of the pressure wavefield samples and the acceleration wavefield samples as a sum of time derivatives of velocity wavefield samples measured at the sample rate with three orthogonal particle motion sensors.

* * * * *